(12) United States Patent
Batalha et al.

(10) Patent No.: US 9,829,042 B2
(45) Date of Patent: Nov. 28, 2017

(54) ROLLING ELEMENT BEARING WITH CAGE

(71) Applicant: Schaeffler Technologies AG & Co. KG, Herzogenaurach (DE)

(72) Inventors: Tiago Batalha, Itu (BR); Rudoniel Cury, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/889,995

(22) PCT Filed: Mar. 17, 2014

(86) PCT No.: PCT/DE2014/200125
§ 371 (c)(1),
(2) Date: Nov. 9, 2015

(87) PCT Pub. No.: WO2014/187456
PCT Pub. Date: Nov. 27, 2014

(65) Prior Publication Data
US 2016/0108964 A1    Apr. 21, 2016

(30) Foreign Application Priority Data
May 21, 2013  (DE) .................. 10 2013 209 288

(51) Int. Cl.
*F16C 33/66* (2006.01)
*F16C 33/41* (2006.01)

(52) U.S. Cl.
CPC ........ *F16C 33/6681* (2013.01); *F16C 33/416* (2013.01); *F16C 33/418* (2013.01); *F16C 33/6629* (2013.01)

(58) Field of Classification Search
CPC ............ F16C 33/41418; F16C 33/6637; F16C 33/6681; F16C 33/41–33/418; F16C 33/6629
See application file for complete search history.

(56) References Cited

U.S. PATENT DOCUMENTS 3,179,478 A *  4/1965  Readdy ................. F16C 19/163
                                                  384/472
3,597,031 A *  8/1971  Bill ........................ B01D 35/02
                                                  384/470
(Continued)

FOREIGN PATENT DOCUMENTS

DE        2657464 A1 *  6/1978  ............ F16C 33/416
DE        10353098        5/2004
(Continued)

OTHER PUBLICATIONS

Machine Translation of JP 2009197960 dated Sep. 2009.*
Machine Translation of JP 2001-082486 dated Mar. 2001.*

*Primary Examiner* — Alan B Waits
(74) *Attorney, Agent, or Firm* — Volpe and Koenig, P.C.

(57) ABSTRACT

A rolling element bearing (1) that includes a plurality of balls (4) as rolling elements guided in a cage (5). A lubricant channel (19) is formed in snap-in pockets (8) in a region between a lateral ring section (6) and the central ball (4) track, between the ball (4) and the adjoining web section (7) and/or the adjoining lateral ring section (6), which fluidically connects the radial outer side and the radial inner side of the cage (5). In order for the rolling element bearing (1) lubricant supply to be improved, on the web sections (7), an outer block section (10) is formed on the radial outer side and/or an inner block section (11) is formed on the radial inner side, which project relative to the lateral ring section (Continued)

(b)

(6), in the radial direction in relation to the bearing axis L, and reduce the available rolling element space between two adjoining balls (4).

9 Claims, 3 Drawing Sheets

(56) References Cited

U.S. PATENT DOCUMENTS

| | | | | |
|---|---|---|---|---|
| 4,425,011 | A * | 1/1984 | Cunningham | F16C 19/364 |
| | | | | 384/571 |
| 6,315,456 | B1 * | 11/2001 | Tanimoto | F16C 19/163 |
| | | | | 29/898.067 |
| 6,890,105 | B2 * | 5/2005 | Ide | F16C 33/416 |
| | | | | 384/470 |
| 7,507,028 | B2 * | 3/2009 | Markle | F16C 33/3875 |
| | | | | 384/470 |
| 8,944,693 | B2 * | 2/2015 | Katsuno | F16C 33/3856 |
| | | | | 384/531 |
| 8,967,873 | B2 * | 3/2015 | Brown | F16C 33/3887 |
| | | | | 384/470 |
| 9,127,716 | B2 * | 9/2015 | Kamamoto | F16C 33/3806 |
| 9,388,856 | B2 * | 7/2016 | Sakamoto | F16C 33/3887 |
| 2003/0012471 | A1 | 1/2003 | Yamamoto et al. | |
| 2004/0141672 | A1 * | 7/2004 | Naito | F16C 33/416 |
| | | | | 384/531 |
| 2011/0305411 | A1 * | 12/2011 | Schweitzer | F16C 19/163 |
| | | | | 384/495 |
| 2015/0354630 | A1 * | 12/2015 | Varnoux | F16C 33/416 |
| | | | | 384/526 |
| 2016/0160921 | A1 * | 6/2016 | Cisco | F16C 33/6614 |
| | | | | 384/531 |

FOREIGN PATENT DOCUMENTS

| | | | | |
|---|---|---|---|---|
| DE | 102008059571 | | 6/2010 | |
| FR | WO 2010106173 | A1 * | 9/2010 | F16C 33/416 |
| JP | H08177865 | | 7/1996 | |
| JP | 2627885 | B2 * | 7/1997 | F16C 33/3843 |
| JP | H9196067 | | 7/1997 | |
| JP | H11325080 | A | 11/1999 | |
| JP | 2001082486 | A | 3/2001 | |
| JP | 2001241447 | A | 9/2001 | |
| JP | 2002081450 | A | 3/2002 | |
| JP | 2002098150 | | 4/2002 | |
| JP | 2003004048 | A | 1/2003 | |
| JP | 2006112595 | | 4/2006 | |
| JP | 2007303599 | A | 11/2007 | |
| JP | 2009197960 | A * | 9/2009 | F16C 33/6629 |
| JP | 2011052814 | | 3/2011 | |
| WO | WO-9949228 | A1 * | 9/1999 | F16C 33/414 |

* cited by examiner (b)

ROLLING ELEMENT BEARING WITH CAGE

FIELD OF THE INVENTION

The invention relates to a rolling element bearing.

BACKGROUND OF THE INVENTION

Ball bearings as embodiments of a rolling element bearing have, in many constructions, an inner and an outer ring between which balls are arranged as rolling elements. Through the relative rotation of the inner and the outer rings, the balls run over raceways of the rings and thus allow a relative rotation of the constructions connected to the rings.

To keep friction losses low and simultaneously increase the service life of the ball bearings, these are usually lubricated with a lubricant. One possible variant of lubrication is lifetime lubrication, wherein the rolling element bearing is provided with a lubricant reservoir that is dimensioned in volume so that it is sufficient for the service life of the rolling element bearing. One challenge from this arrangement is to prevent the lubricant from settling in regions within the rolling element bearing that do not need lubrication, wherein this would thus cause other regions that require lubrication to not be properly supplied. In light of these conditions, cages have been designed in ball bearings that guide the rolling elements so that these support the flow of lubricant.

Publication DE 10 2008 059 571 A1 that forms the closest prior art relates to a rolling bearing with an inner ring, an outer ring, rolling elements that are arranged between the rings, and a cage device with windows in which the rolling elements are arranged and hold the rolling elements at least in some sections with a bordering wrap-around wall. In the publication it is proposed that each wrap-around wall forms, in an area passing through the ball center track, a support surface defined by a left lubricant flow-through channel and a right lubricant flow-through channel. Through the lubricant flow-through channels it is achieved that an advantageous lubricant distribution to the load-bearing peripheral regions of the rolling elements is guaranteed.

SUMMARY

The invention is based on the objective of providing a rolling element bearing that realizes an improved lubricant supply.

This object is achieved by a rolling element bearing one or more features of the invention. Preferred or advantageous embodiments of the invention are given from the claims, the following description, and the accompanying figures.

The subject matter of the invention is a rolling element bearing that is constructed, in an especially preferred way, as a radial bearing. The rolling element bearing comprises a plurality of balls as rolling elements that are arranged in an especially preferred way in one row in the rolling element bearing. The balls are preferably made from metal, but alternatively other materials, such as ceramic, could also be used.

The rolling element bearing has, in particular, an inner raceway section and an outer raceway section, on which the balls roll as rolling elements. In particular, the rolling element bearing has an inner ring and an outer ring on which the corresponding raceways are supported.

Furthermore, the rolling element bearing comprises a cage for guiding and/or spacing the balls in the circumferential direction. The cage is made, in an especially preferred way, from plastic, because plastic allows particularly large freedom of design with regard to the shape of the cage. The cage comprises a side ring section that has a wrap-around construction and a plurality of web sections that are arranged on the side ring section. In particular, web sections and side ring sections have an integral construction and are realized, for example, as a common injection molded part. The side ring section together with the web sections forms snap-in pockets that are preferably arranged equidistantly in the circumferential direction, wherein one of the balls is arranged in each of the snap-in pockets. The balls are held captively, in particular, in a self-retaining manner, in the snap-in pockets by a positive fit connection. The balls are snapped into the snap-in pockets during assembly and held in the snap-in pockets by a positive fit connection by a wrap-around wall. For the purpose of description, it is defined that the cage defines a bearing axis of the rolling element bearing.

In the snap-in pocket, in particular, in some snap-in pockets, especially in all snap-in pockets, a lubricant channel is formed in an area between the side ring section and the ball center track of the balls between the ball and the adjacent web section and/or the adjacent side ring section. The ball center track is formed as an imaginary circle that is concentric to the bearing axis and runs through the centers of the balls. In particular, the lubricant channel is arranged in a corner area of the snap-in pocket. In an especially preferred way, the snap-in pocket, in particular, some snap-in pockets, especially all snap-in pockets, have a lubricant channel in both corner regions facing the side ring section. The lubricant channel is constructed so that this connects the radial outer side with respect to the bearing axis and the radial inner side with respect to the bearing axis of the cage in terms of flow. In particular, the lubricant channel runs in the radial direction toward the bearing axis. The lubricant can be preferably a lubricating grease or a lubricating oil.

Advantageously, the rolling element space of the rolling element bearing is sealed from the environment, e.g., by seals, so that lubricant cannot escape. In particular, the rolling element bearing has lifetime lubrication.

In the scope of the invention it is proposed that an outer block section is formed on the web sections on the radial outer side and/or an inner block section is formed on the radial inner side. The web sections are thus reinforced or "doubled" in the radial direction. The outer block section projects outward relative to the side ring section with respect to the bearing axis in the radial direction. As an alternative or addition, the inner block section projects inward relative to the side ring section with respect to the bearing axis in the radial direction. In this way, the available rolling element space is reduced between two adjacent balls. The rolling element space is the volume that the rolling elements take up during their rotation between the outer ring section and the inner ring section.

The advantage of the outer block section and/or the inner block section is that the rolling element space between the balls is reduced, so that there is no settling or collection of lubricant in these regions, which would then accumulate unused during the further service life of the rolling element bearing. At the same time, however, the transport of lubricant in the circumferential direction between the snap-in pockets is blocked by the outer block section and/or the inner block section, because the block sections simultaneously form barriers. For this reason it is provided that the outer block section and/or the inner block section project relative to the side ring section in the radial direction. In this way, lubricant can flow starting from the outer block section and/or inner block section or from the snap-in pockets in the direction of the side ring section and can move past the outer block section or inner block section to the next snap-in pocket. This guarantees that, during operation of the rolling element bearing, the lubricant is distributed uniformly in the circumferential direction. Simultaneously, the lubricant is blocked at least by the outer block section and therefore the lubricant channel is provided with lubricant, so that transport in the radial direction from the radial outer side to the radial inner side of the cage is achieved.

In one possible structural construction of the invention, the cage has, on the edge, a wrap-around free ring area that is bordered in the axial direction by the outer block sections or by the inner block sections and in the radial direction by the side section. The wrap-around free ring area is formed, in particular, as an edge area that guarantees the transport of the lubricant in the circumferential direction.

In one possible structural construction of the invention, the outer block section has an edge that runs in the axial direction and faces the adjacent snap-in pocket and connects to a retaining surface facing the adjacent snap-in pocket for the lubricant. In particular, the retaining surface extends in an imaginary plane in which the bearing axis is also arranged. Between the retaining surface and the ball in the adjacent snap-in pocket, a lubricant collection space is formed that is connected in terms of flow to the lubricant channel. During operation, lubricant is collected in the lubricant collection space by the retaining surface, wherein the lubricant can be redistributed out of the lubricant collection space and thus actively used again.

In one especially preferred embodiment of the invention, the specified edge has a straight line construction and/or the retaining surface is flat. In this construction, lubricant can be collected in the lubricant collection space in an especially easy way.

In another construction of the invention, the lubricant collection space is defined in the axial direction by the side ring section, in the circumferential direction by the retaining surface, and in the radial direction by a base section. The base section is offset inward in the radial direction relative to a radial top side of the side ring section. The side ring section is offset inward in the radial direction relative to the top side of the outer block section. This stepped construction has the advantage that lubricant can flow out of the lubricant collection space, first, via the side ring section and then via the surrounding free ring area in the circumferential direction and simultaneously or alternatively via the lubricant channel. If the cage is viewed in the top view in the radial direction toward the bearing axis, the base section has an angular retaining surface, wherein a side edge is formed by the side ring section and the second side edge is formed by the retaining surface.

In one preferred refinement of the invention, the free limiting edge of the base section that faces the ball arranged in the snap-in pocket is formed in its profile in a middle section with a radius concentric to the ball. Through the middle section, the ball is guided during operation, wherein the middle section simultaneously forms a part of the positive fit connection. In the edge area, in the direction of the side ring section, the limiting edge is further formed, wherein an input opening for the lubricant channel is produced by the difference between the radius and the additional construction.

In one preferred structural construction of the invention, the free bottom side of the inner block section has a concave molding with four funnel segments that are open on the outside. In particular, the funnel segments in the bottom view have triangular constructions on the free bottom side. Two of the funnel segments are oriented in opposing sense relative to each other in the circumferential direction, and the other two funnel segments are oriented in the opposing sense relative to each other in the axial direction. Through the concave molding, an additional lubricant reservoir is formed, wherein through the funnel segments it is achieved that lubricant that reaches the molding is output again via the funnel segments. The output of the lubricant is thus realized through the first two funnel segments to the adjacent snap-in pockets and through the other two funnel segments in the axial direction, on one hand, in the direction of the side ring section, wherein this part of the lubricant can be redistributed in the circumferential direction via the free ring area and, on the other hand, in the other axial direction. In this way, the lubricant is also actively redistributed to the bottom side of the cage.

In one possible refinement of the invention, there is a lubricant opening running in the axial direction in the side ring section for each snap-in pocket. The lubricant opening allows the penetration of lubricant out of the axial direction into the snap-in pocket and in this way improves the lubricant flow. In particular, the depth extent of the lubricant opening in the radial direction is tailored to the ball. The input of the lubricant opening is especially coaxial to the ball in the snap-in pockets. In this way, the lubricant opening can guide the balls in the axial direction and simultaneously supply them with lubricant.

In one preferred structural construction, the cage is formed as a comb-shaped cage, wherein during operation, the axial side facing away from the side ring section has open web sections. This construction again emphasizes the advantageous effect of the invention, wherein the lubricant can be distributed unimpaired on the open axial side of the comb-shaped cage and on the side of the side ring section, the distribution in the circumferential direction is achieved through the offset of the outer block section or the inner block section.

In one preferred structural realization of the invention, each web section is formed as a solid block together with the molded outer block section and the molded inner block section, wherein this block extends over at least 25% in the radial direction, preferably over at least 50%, especially over at least 75% of the diameter of the ball in the rolling element bearing.

BRIEF DESCRIPTION OF THE DRAWINGS

Additional features, advantages, and effects of the invention are given from the description below of a preferred embodiment of the invention. Shown are.

DETAILED DESCRIPTION OF THE PREFERRED EMBODIMENTS

Figure 1:
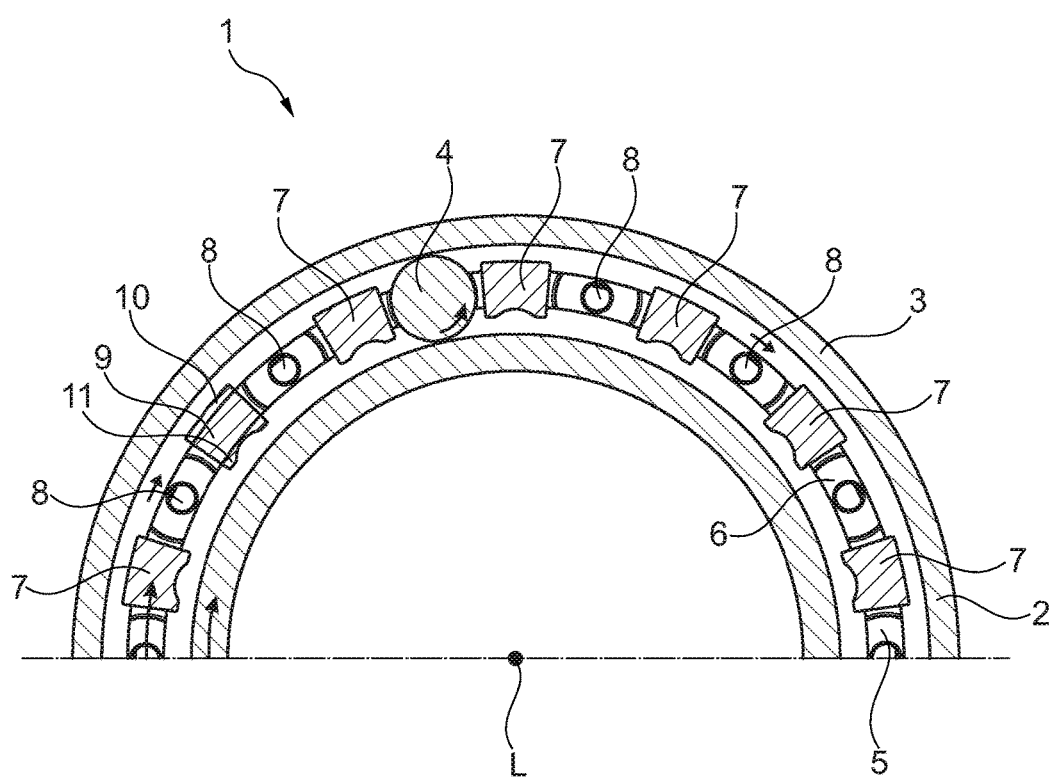
FIG. 1 a schematic top view of a rolling element bearing as an embodiment of the invention, FIG. 2 the cage of the rolling element bearing in FIG. 1 in a schematic three-dimensional view, FIG. 3 a detail from the cage in FIG. 2.

FIG. 1 shows a rolling element bearing 1 as an embodiment of the invention in a schematic axial top view, wherein only half of the rolling bearing 1 is shown. The rolling element bearing 1 comprises an inner ring 2 and an outer ring 3, wherein a plurality of balls 4 as rolling elements are arranged between the inner ring 2 and outer ring 3, so that these roll on raceways of the rings 2, 3 for relative rotation of the inner ring 2 and outer ring 3 about a bearing axis L.

The rolling element bearing 1 comprises a cage 5 that is made from plastic. The cage 5 comprises a side ring section 6 that is formed as a ring washer extending in a radial plane perpendicular to the bearing axis L, as well as a plurality of web sections 7 that extend in the axial direction and are formed on the side ring section 6. Through the web sections 7, uniformly distributed snap-in pockets 8 are produced in the circumferential direction, wherein each snap-in pocket 8 is defined in the circumferential direction by one of the web sections 7 and in the axial direction by the side ring section 6. The snap-in pockets 8 are defined so that the balls 4 in the snap-in pockets 8 are secured against falling out in the axial or radial direction with a positive fit connection. For this purpose, each of the snap-in pockets 8 has a wrap-around wall, so that dislocation in the radial direction is prevented. From FIG. 3 it can be seen, for example, that the wrap-around wall has a convex design also in the axial direction so that the balls 4 are surrounded as if by brackets and also cannot become dislocated in the axial direction. In particular, the balls 4 are arranged in the cage 5 in a self-retaining manner and, in particular, they are snapped in place. The cage 5 is thus realized as a snap-in cage.

Figure 2:
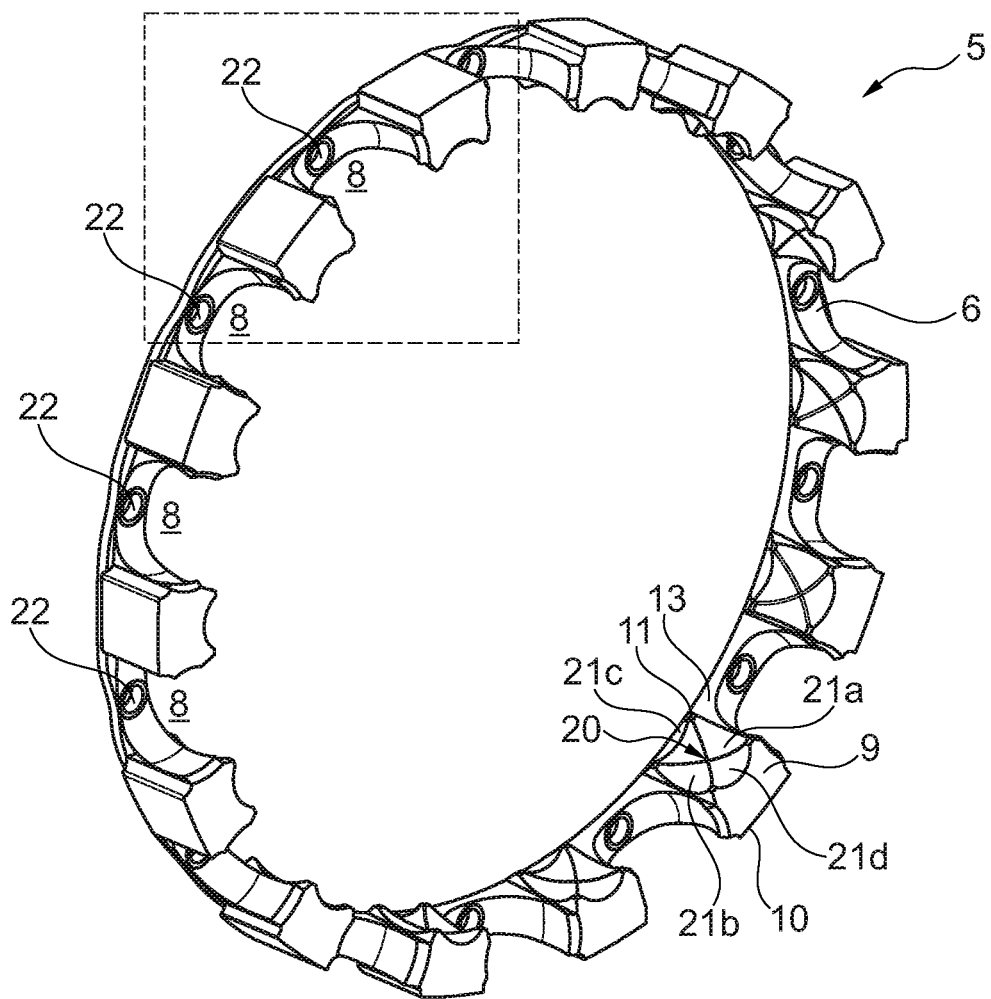
Figure 3:
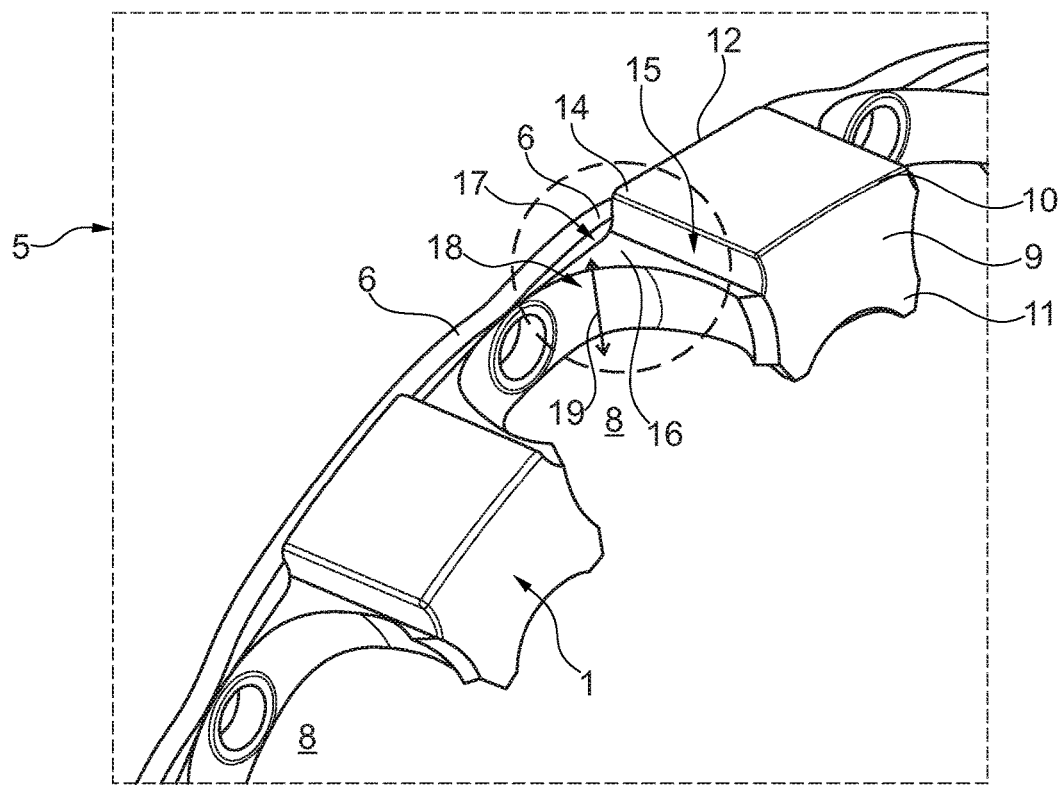

Looking at FIGS. 1, 2, and 3 together, it can be seen that the web sections 7 can each be broken down into a middle section 9, a radial outer block section 10, and a radial inner block section 11. The middle section 9 extends in the axial overlap area toward the side ring section 6. As can be seen especially from FIG. 3, the outer block section 10 is arranged offset in the radial direction relative to the side ring section 6, so that on the edge, a wrap-around free edge area or edge area 12 is produced. The top side of the outer block section 10 is constructed as a uniform surface that can be formed selectively flat or parallel to the hollow cylindrical inner surface of the outer ring 3. Intermediate shapes are also possible here. As can be seen best from FIG. 2, the inner block section 11 also projects in the radial direction over the side ring section 6, so that a wrap-around free ring area 13 is also produced on the radial inner side of the cage 5.

The outer block section 10 is defined on the side facing the snap-in pocket 8 on the top side by a straight edge 14 that is oriented in the axial direction and/or parallel to the bearing axis L and transitions there at a right angle or at an approximately right angle into a retaining surface 15 that extends in the radial direction.

The retaining surface 15 ends by meeting a base section 16 whose surface extent is perpendicular or approximately perpendicular to a radial vector relative to the bearing axis L. On the axial side, the base section 16 is defined by the side ring section 6, so that seen in the radial top view, an approximately triangular lubricant collection space 17 is produced. The free boundary edge 18 of the base section 16 is formed in the area of the ball center track of the balls 4 with a radius concentric to the ball 4, so that the balls 4 can be guided and retained. In the edge area in the direction of the side ring section 6, the boundary edge 18 returns opposite the radius, so that a radial lubricant channel 19 is formed between the ball 4 and the transition area between the side ring section 6 and web section 7.

During the operation of the rolling element bearing 1, lubricant is brought into the lubricant collection space 17 that is selectively transported through the lubricant channel 19 from a radial outer side of the cage 5 to a radial inner side of the cage 5 or flows out via the side ring section 6 and is guided via the ring area 13 past the outer block section 10 and to the next snap-in pocket 8.

One idea of the construction is to reduce the rolling element space between the balls 4 in the area of the web sections 7, in order to prevent unnecessary accumulation of lubricant in these areas. The lubricant supply is also improved. This is achieved in that the lubricant is collected in the lubricant collection space 17 via the retaining surface 15 and transported, on one hand, via the lubricant channel 19 and, on the other hand, via the ring area 13.

For further supporting the improved lubricant supply of the rolling element bearing 1, concave moldings 20 are formed on the bottom side of the inner block sections 11 that are divided into four funnel sections 21*a, b, c, d*. The funnel sections 21*a, b, c, d* have inner triangular constructions in the radial top view, wherein their tips meet in the center of the inner block section 11. Two of the four funnel sections 21*a, b* are oriented in the direction of the snap-in pockets 8. The other two funnel sections 21*c, d* are oriented in the axial direction. Through the concave molding 20, lubricant can be collected on the bottom side of the web sections 7 and can be distributed in a controlled way, on one hand, in the direction of the snap-in pockets 8 and, on the other hand, in the direction of the side ring section 6, wherein the lubricant can be transported via the ring area 13 to other snap-in pockets 8 in the circumferential direction.

The cage 5 also has axial lubricant openings 22 that are formed as round passage holes in the side ring sections 6. The central axis of the lubricant openings 22 here passes through the center of the balls 4 arranged in each of the snap-in pockets 8, so that the balls 4 are simultaneously guided by the input opening of the lubricant opening 22.

List of Reference Numbers
1 Rolling element bearing
2 Inner ring
3 Outer ring
4 Balls
5 Cage
6 Side ring section
7 Web sections
8 Snap-in pockets
9 Middle section
10 Outer block section
11 Inner block section
12 Edge area
13 Ring area
14 Edge
15 Retaining surface
16 Base section
17 Lubricant collection space
18 Limiting edge
19 Lubricant channel
20 Concave moldings
21*a, b, c, d* Funnel sections
22 Lubricant openings
L Bearing axis

The invention claimed is:

1. A rolling element bearing comprising a plurality of spherical rolling elements, a cage that guides the spherical rolling elements, the cage including a side ring section and a plurality of web sections that are arranged on the side ring section and form snap-in pockets, one of the spherical rolling elements is arranged in each of the snap-in pockets and is held captively by a positive-fit connection, the cage defines a bearing axis (L), and in each of the snap-in pockets, in an area between the side ring section and a spherical rolling element center track of the spherical rolling elements between the spherical rolling element and at least one of an adjacent web section or an adjacent side ring section, a lubricant channel is formed that fluidly connects a radial outer side and a radial inner side of the cage, an outer block section is formed on the web sections on the radial outer side or an inner block section is formed on the radial inner side, or both the outer block section and the inner block section are formed, and said inner or outer block section, or both, projects relative to the side ring section with respect to the bearing axis (L) in a radial direction and reduces an available rolling element space between two adjacent ones of the spherical rolling elements, the outer block section forms an edge running in an axial direction and facing an adjacent snap-in pocket, to which a retaining surface for lubricant facing the adjacent snap-in pocket connects, and a lubricant collection space that is fluidly connected to the lubricant channel is formed between the retaining surface and the spherical rolling element, the lubricant collection space is limited in the axial direction by the side ring section, in a circumferential direction by the retaining surface, and in the radial direction by a base section, and the base section is offset inward in the radial direction opposite a top side of the side ring section, so that lubricant can flow out via the side ring section and simultaneously via the lubricant channel, wherein a free bottom side of the inner block section has a concave molding with four funnel segments.

2. The rolling element bearing according to claim 1, wherein the cage has, on an edge, a surrounding free ring area that is limited in the axial direction by the outer block sections or by the inner block sections and in the radial direction by the side ring section.

3. The rolling element bearing according to claim 1, wherein the edge is constructed as a straight line.

4. The rolling element bearing according to claim 1, wherein a free limiting edge of the base section is formed in its profile in a middle section with a radius concentric to the spherical rolling element and in an edge area continuing as in the middle section, so that an inlet opening for the lubricant channel is formed.

5. The rolling element bearing according to claim 1, wherein two of the funnel segments are oriented in an opposing sense relative to each other in the circumferential direction and two of the funnel segments are oriented in an opposing sense relative to each other in the axial direction.

6. The rolling element bearing according to claim 1, wherein in the side ring section for each of the snap-in pockets, a lubricant opening running in the axial direction is oriented in the radial direction toward the center of an adjacent spherical rolling element.

7. The rolling element bearing according to claim 1, the cage is formed as a comb-shaped cage.

8. The rolling element bearing according to claim 7, wherein each of the web sections forms a solid block together with the outer block section and the inner block section, and said block extends in the radial direction over a width of at least 25% of a diameter of the spherical rolling element.

9. The rolling element bearing according to claim 1, wherein the retaining surface is flat.

* * * * *